United States Patent [19]

Smith

[11] Patent Number: 5,072,633

[45] Date of Patent: Dec. 17, 1991

[54] DRIVE EXTENSION

[76] Inventor: Roger R. Smith, 7261 Lyons Rd., Imlay City, Mich. 48444

[21] Appl. No.: 666,535

[22] Filed: Mar. 7, 1991

Related U.S. Application Data

[63] Continuation-in-part of Ser. No. 578,033, Sep. 4, 1990, abandoned.

[51] Int. Cl.$^5$ ............................................. B25B 17/00
[52] U.S. Cl. .................................... 81/57.3; 474/136; 81/57.26
[58] Field of Search ............... 81/57.3, 57.26–57.29, 81/57.31, 57.13, 57.14; 474/113, 136

[56] References Cited

U.S. PATENT DOCUMENTS

| | | | |
|---|---|---|---|
| 2,722,132 | 11/1955 | Russell | 474/113 |
| 2,746,331 | 5/1956 | Andersen | 81/57.3 X |
| 3,392,608 | 7/1968 | Schanen et al. | 81/57.3 X |
| 4,836,101 | 6/1989 | Kato | 474/113 X |

FOREIGN PATENT DOCUMENTS 2108029  5/1983  United Kingdom .................. 81/57.3

Primary Examiner—D. S. Meislin
Attorney, Agent, or Firm—Peter A. Taucher; Gail S. Soderling

[57] ABSTRACT

An improved extension for use with tools is disclosed. The extension has a pair of gears located on a frame. The gears have a chain drive therebetween to allow the force applied to one gear to be applied to the other gear. The structure allows a drive member such as a socket to be offset from the drive handle.

2 Claims, 1 Drawing Sheet

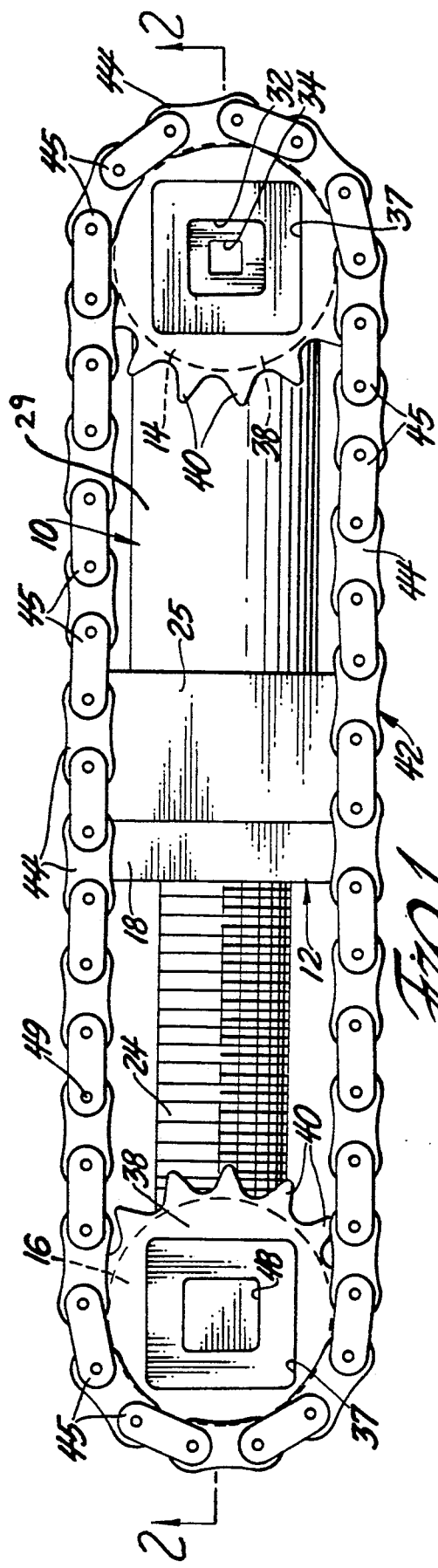

DRIVE EXTENSION

GOVERNMENT INTEREST

The invention herein described may be manufactured, used and licensed by or for the U.S. Government for governmental purposes without payment to me of any royalty thereon.

CROSS REFERENCE TO RELATED APPLICATION

This application is a continuation in part of U.S. patent application Ser. No. 07/578,033, filed September 4, 1990 now abandoned.

BACKGROUND OF THE INVENTION

1. Field of the invention

In one aspect of this invention it relates to tools useful for applying a rotating force to nuts, bolts and the like. In further aspect this invention relates to tool extensions useful for addition to normal driving devices where the location of the object to be driven is located in a hard to reach position.

2. Prior art

Socket and square drive type wrenches are frequently used for tightening bolts. In particular torque wrenches are used for tightening fasteners such as bolts to a specified tension in order to provide uniform holding power. Frequently the bolt to be tightened is located in a position where the socket or other drive means cannot be brought into close proximity to the bolt. Under these circumstances it is necessary to use an extension to place the socket or other tightening means on the bolt to be tightened. Such extensions are normally straight shafts having a square drive end at one end and a attachment end adapted to fit and engage the drive means In addition, universal type joints can be attached to a drive means to allow a certain amount or angular misalignment between the drive of the socket, and the fastener.

For the majority of operations the straight shaft extension combined with universal or other type joints provides an adequate means for extending the reach of the drive handles. However, there are situations where the fastener to be tightened is offset in such a manner that the standard joints and extensions will not allow access to the fastener.

SUMMARY OF THE INVENTION

The present invention provides an extension suitable for use with a socket or other driving means and useful for tightening a fastener at a position offset from the location in which the handle can be conveniently located for the motion necessary to provide a driving force. The problems of the prior art are solved by the wrench extension of the present invention which has a frame member with an adjustable center portion variable in length which can be locked at the desired length. First and second mounting members are located one on each end of the frame member with each mounting member being adapted to hold a driving means. In one mounting member an input drive means is rotatably positioned, the input drive means being adapted to receive an externally applied force such as might be applied by a socket, drive handle or other driving device. A first sprocket is mounted on the input drive and rotated when a rotating force is applied to the input drive means. A second sprocket is rotatably mounted on an output drive in the other mounting member the output drive means being adapted to engage the fastener to be rotated. An adjustable endless chain adapted to engage the sprockets is disposed about the two sprockets so that a force applied to the input drive will cause rotation of the first socket and through the chain a corresponding rotation of the second socket rotating the output drive means and the fastener.

BRIEF DESCRIPTION OF THE DRAWINGS

In the accompanying drawings:

FIG. 1 is a top view of one embodiment of this invention;

FIG. 2 is a sectional view of the construction or FIG. 1 taken along the line 2—2.

DETAILED DESCRIPTION OF THE PREFERRED EMBODIMENTS

Referring to the accompanying drawing wherein like numerals designate like parts and initially to FIG. 1, the invention will be described with specific reference to the square socket drive found on standard socket wrenches and extension bars. The extension of this invention would be useful with drive means other than the normal square drive socket wrenches, i.e. pneumatic tools, torque wrenches and the like. The improved wrench extension of this invention has a frame member 10 with an adjustable center portion 12 adapted to be varied in length and locked at the desired length. The variable center portion 12 has a first mounting member 14, attached to one end and a second mounting member 16 attached to the other end. Both mounting members have an input means and an output means mounted therein as will described later.

The center portion 12 comprises a threaded rod 24 and cylindrical extension 29, which are threadably engaged. The threaded rod 24 and cylindrical extension 29 can be rotated relative to each other to adjust the length of the center portion. To begin adjusting the center portion 12 clamp 20 is loosened by untightening bolt 22 allowing collar 25 to open and a threaded flange 18 is rotated away from the clamp. With threaded flange 18 moved toward the second mounting means 16, threaded rod 24 can be rotated to move second mounting member 16 longitudinally closer to or further away from the first mounting member 14. The collar 25 has a key portion 26 extending radially inwards which engages a corresponding slot 28 in the threaded rod 24. The key 26 helps keep the rod and cylindrical extension 29 axially aligned during adjustment. When the desired length is achieved the collar 25 is moved into engagement with the end of cylindrical extension 29 and the bolt 22 tightened so that clamp 20 is securely fastened. The threaded flange 18 is then tightened to jam against the end of the clamp 20 to hold the entire center assembly 12 in a rigid, fixed configuration.

The chain 42 connecting the drive means can then be engaged with the sprocket. As shown the chain 42 is of the flat standard roller chain variety with a plurality of links 44 flexibly joined with a plurality of arms 45 using pins 49. Such chains can have one or more links removed to adjust the length of the chain. Such chains are made in a wide variety of sizes from very small up to the size used in motorcycles. The size of the chain would be determined by the duty cycle and expected force to be transmitted by the chain. Other adjustable, flexible chains ameanable for use with gear drives could also be used. Because there is flexibility in the chain 42 there is flexibility in the connection between the first and second drive means the axis of the first and second mounting members 14, 16 can be disposed at an angle to allow a driving force and an input force to operate at an angle to each other.

The first mounting member 14 has an input drive means designated generally 30 with a body 31 rotatably mounted on and extending through the first mounting member. As shown the body 31 has two separate and distinct square drive cavities 32, 34. The larger drive cavity 32 could be sized for a ½ inch socket and the smaller drive cavity could be sized to correspond to the standard ¼ inch socket. As shown, the input drive means 14 is held in position by means of two retaining rings 36 which engage the body 31 and are located at each end of the mounting means 30. In use, the desired driving force would be inserted into the complimentary drive cavity of the body portion 31 of input drive means 14 and the body portion rotated.

The input body 31 has a square surface 37 adapted to engage a corresponding cutout in a sprocket 38. The sprocket 38 shown has a plurality of teeth 40 which are adapted to engage the links of the flat standard roller chain 42 which comprises a plurality of links 44 flexibly joined by a plurality of arms 45 in a manner well known in the art.

The output drive means of the present invention 46 has a body portion 47 rotatably mounted in the second mounting member 16 and held in place by retaining rings 36 in a matter similar to the input drive means 30. The output drive means body 47 as shown has a square chamber 48 formed longitudinally therethrough with a slideable driving head 50 located and retained within the chamber 48. The slideable driving head 50 can be moved longitudinally through the chamber 48 to provide a driving force on either side of the output drive means. As shown the driving head 50 is located so that a socket or other fastener engaging means would be attached on the side of the driving head 50 opposite the sprocket 38.

In operation the fastener engaging means such as a socket, screw driver or "TORX" type fastener engaging means having a square drive portion would be placed on extended part of the driving head 50 and the adjustable center portion 12 extended to the desired length. A driving means such as a socket wrench, square drive extension or pneumatic device would be placed in engagement with the input means and rotation commenced causing a rotating action on the fastener. Because of the flexible nature of the chain engaging the sockets there can be an angle between the axis of the input means and the output means. The maximum angle between the two axis will depend on the flexibility of the chain and the distance between the sprockets. It could be as much as 90 degrees but in general it will need to be only a few degrees.

The sprockets are shown as being equally sized providing a one-to-one mechanical ratio with respect to the input and output drive means. If desired, the size of the sprockets can be varied in order to provide increased or decreased torque with respect to the input or can be used to vary the speed of rotation between the input and output means.

I wish it to be understood that I do not desire to be limited to the exact details of construction shown and described for obvious modifications will occur to a person skilled in the art, without departing from the spirit and scope of the appended claims.

What is claimed is:

1. An improved drive extension for use with a drive assembly comprising: an adjustable frame member having an adjustable center portion formed of a threaded rod and a cylindrical extension, the threaded rod and cylindrical extension being threadably engaged so that relative rotation therebetween will cause the frame member to vary in length, the threaded rod having locking means including a collar which engages the cylindrical extension and a threaded flange, the collar having a key extending radially inward, the key engaging a corresponding slot in the threaded rod to keep the adjustable center portion aligned, the collar locking the frame at the desired length when closed and the threaded flange being rotatable on the threaded rod rotated to hold the collar in position thereby locking the frame member at a desired length; first and second mounting members, one mounting member being attached to each end of the frame member and being adapted to rotatably hold drive means; an input drive means rotatably mounted in the first mounting member, the input drive means being adapted to receive an externally applied force, and having attached thereto a first sprocket which is rotated when a rotating force is applied to the drive means; an output drive means rotatably mounted in the second mounting member, the output drive means is adapted to engage means for applying a rotating force to a desired location; a second sprocket attached to the output drive means; an adjustable endless chain, said chain being adjustable so that it is disposed about the two sprockets with minimal slack whereby a force applied to the input drive will cause rotation of the first socket and through the chain the rotation of the second socket rotating the output drive.

2. The drive extension of claim 1 where the first and second sprockets are of different sizes so there is a difference in rotation rate between the input drive and output drive resulting in a mechanical advantage.

* * * * *